United States Patent
Johnsson

(10) Patent No.: US 10,390,208 B2
(45) Date of Patent: *Aug. 20, 2019

(54) OPERATOR-ASSISTED DEVICE-TO-DEVICE (D2D) DISCOVERY

(71) Applicant: Intel Corporation, Santa Clara, CA (US)

(72) Inventor: Kerstin Johnsson, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/944,668

(22) Filed: Apr. 3, 2018

(65) Prior Publication Data

US 2018/0227741 A1 Aug. 9, 2018

Related U.S. Application Data

(63) Continuation of application No. 15/413,320, filed on Jan. 23, 2017, now Pat. No. 9,955,338, which is a
(Continued)

(51) Int. Cl.
*H04W 8/00* (2009.01)
*H04W 76/14* (2018.01)
(Continued)

(52) U.S. Cl.
CPC ........... *H04W 8/005* (2013.01); *H04W 12/06* (2013.01); *H04W 76/14* (2018.02); *H04W 84/18* (2013.01)

(58) Field of Classification Search
CPC .............................. H04W 84/12; H04W 84/18
See application file for complete search history.

(56) References Cited

U.S. PATENT DOCUMENTS 9,955,338 B2 * 4/2018 Johnsson .............. H04W 8/005
2009/0077220 A1 3/2009 Svendsen et al.
(Continued)

FOREIGN PATENT DOCUMENTS

WO WO 2011087408 A1 7/2011
WO WO 2011116017 A1 9/2011
(Continued)

OTHER PUBLICATIONS

Abraham et al.; "Efficient Device and Service Discovery for Peer-to-Peer (P2P) Scenarios"; IEEE 802.11-11/1517r0; (Oct. 25, 2011); 15 pages.
(Continued)

*Primary Examiner* — Afshawn M Towfighi
(74) *Attorney, Agent, or Firm* — Thorpe North & Western

(57) ABSTRACT

A first user equipment (UE) operable to perform wireless wide area network (WWAN) operator-assisted device-to-device (D2D) communications with a second UE is disclosed. The first UE can process D2D discovery and wireless local area network (WLAN) configuration information received from a WWAN when the first UE and the second UE are within a WLAN direct communications range. The first UE can initiate operator-assisted WLAN direct communications with the second UE within the WLAN direct communications range using the D2D discovery and WLAN configuration information received from the WWAN.

20 Claims, 7 Drawing Sheets

Related U.S. Application Data continuation of application No. 13/997,736, filed as application No. PCT/US2012/032987 on Apr. 11, 2012, now Pat. No. 9,554,262.

(51) Int. Cl.
  *H04W 12/06* (2009.01)
  *H04W 84/18* (2009.01)

(56) References Cited

U.S. PATENT DOCUMENTS

| | | |
|---|---|---|
| 2009/0287827 A1 | 11/2009 | Horn et al. |
| 2011/0142014 A1 | 6/2011 | Banerjee et al. |
| 2011/0258131 A1 | 10/2011 | Datars et al. |
| 2011/0258313 A1 | 10/2011 | Mallik et al. |
| 2012/0011247 A1 | 1/2012 | Mallik et al. |
| 2012/0300712 A1 | 11/2012 | Hakola et al. |
| 2013/0034082 A1* | 2/2013 | Etemad ............... H04W 36/14 370/331 |
| 2013/0201842 A1 | 8/2013 | Chou et al. |

FOREIGN PATENT DOCUMENTS

| | | |
|---|---|---|
| WO | WO 2011121374 A1 | 10/2011 |
| WO | WO 2012006446 A1 | 1/2012 |
| WO | WO 2012012229 A2 | 1/2012 |

OTHER PUBLICATIONS

Fodor et al.; "Design Aspects of Network Assisted Device-to-Device Communications"; IEEE Communications Magazine; (May 2011); pp. 2-9.

Intel; "Operator Managed and Operator Assisted D2D"; 3GPP TSG S1-120063; (Feb. 13-17, 2012); 4 pages; SA WG1 Meeting #57, Kyoto, Japan; Agenda: 9.7 FS_ProSe.

Intel; "ProSe Use Case for Operator-Assisted D2D Content/Service Discovery;" 3GPP TSG S1-120064; (Feb. 13-17, 2012); 3 pages; SA WG1 Meeting #57, Kyoto, Japan; (Agenda: 9.7 FS_ProSe).

\* cited by examiner

OPERATOR-ASSISTED DEVICE-TO-DEVICE (D2D) DISCOVERY

RELATED APPLICATIONS

The present application is a continuation of U.S. patent application Ser. No. 15/413,320, filed Jan. 23, 2017, which is a continuation of U.S. patent application Ser. No. 13/997,736, filed Apr. 21, 2014, which is a national stage application of International Patent Application No. PCT/US2012/032987 filed on Apr. 11, 2012, all of which are hereby incorporated by reference in their entirety.

BACKGROUND

Wireless mobile communication technology uses various standards and protocols to transmit data between a transmission station and a wireless device (e.g., mobile device). Some wireless communication technologies use orthogonal frequency-division multiplexing (OFDM) combined with a desired digital modulation scheme via a physical layer. Standards and protocols that use OFDM include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the transmission station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless mobile device, known as a user equipment (UE). In IEEE 802.16 WiMAX RANs, the transmission station can be referred to as a base station (BS). In IEEE 802.11 WiFi RANs, the transmission station can be referred to as a WiFi wireless access point (WAP).

Wireless mobile communication technology can also include device-to-device (D2D) communication where two mobile devices can communicate directly with each other without a transmission station. The mobile devices may include a radio to communicate with the transmission station and a radio to communicate directly with another mobile device. If the radios' bands are far enough apart, the mobile devices may be active simultaneously (i.e., the wireless device may communicate with the base station and another wireless device simultaneously). If the bands are not far enough apart to avoid significant interference, the radios may be active at different time intervals. Wireless devices with a single radio may also communicate with the transmission station and the other mobile device at different time intervals.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
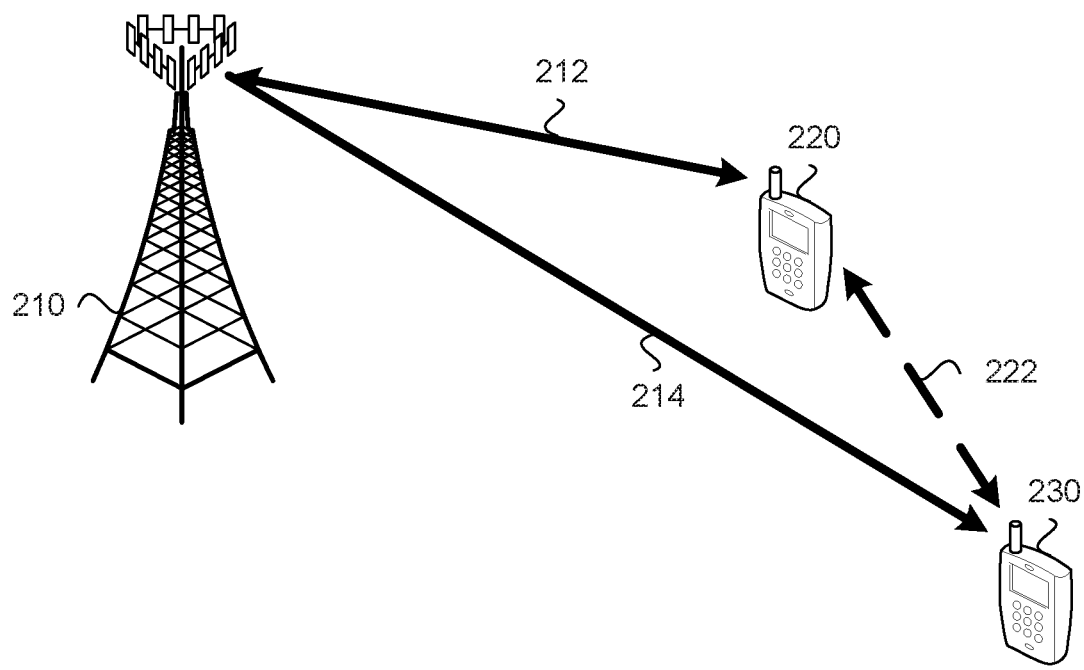
FIG. 1 illustrates a block diagram of a requesting wireless device, a serving wireless device, and a transmission station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Definitions

As used herein, the term "mobile device," "wireless device," or "wireless mobile device," refers to a computing device capable of wireless digital communication such as a smart phone, a tablet computing device, a laptop computer, a multimedia device such as an iPod Touch®, or other type computing device that provides text or voice communication.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Device-to-device (D2D) communication can be used after wireless devices (e.g., mobile devices) first "discover" each other. A D2D discovery process can be highly resource consuming on the ad-hoc, D2D networks, including licensed and unlicensed networks. A licensed network includes use of part of a radio spectrum sold to, licensed to, or used by operators of a private or government radio transmission system. The D2D discovery process can include the mobile devices randomly sending requests for potential peers in hopes that other mobile devices are listening during that same period. The periodic polling of a D2D discovery process in attempts to find other devices that are listening can accelerate the drain of the battery of the mobile device and cause significant interference on the radio band.

A multi-radio mobile device contains multiple radio access technologies (e.g., LTE and WiFi). An operator network using transmission stations can include a wide area network (WAN), such as licensed band cellular network using a LTE or IEEE 802.16 standard, or a local area network (LAN) such as unlicensed band IEEE 802.11 (i.e., WiFi). An ad-hoc, D2D network may reside on the same band as the operator network or the ad-hoc, D2D network can include an out-of-band (OOB) network (e.g., an unlicensed or licensed band different from the operator network bands). The chances of two single-radio wireless devices listening (i.e. receiving) and transmitting at the same time may be low depending on the wireless devices' sleep/idle patterns, traffic loads, and other factors. The chances of two time-division duplex (TDD) (i.e., time shared) multi-radio wireless devices listening and transmitting at the same time may be even lower since the radios (e.g. LTE and WiFi) of the wireless devices alternate active time. Thus, the D2D discovery process may be even longer on a TDD multi-radio device than on a single radio device, and resources consumed (including bandwidth and power) may increase.

The D2D discovery can be more efficient and consume less power by using the operator network to assist the ad-hoc, D2D network in the D2D discovery process. Using operator-network-assisted D2D discovery can improve performance for multi-radio devices, running (e.g., transmitting) simultaneously or in TDD mode. The operator-network-assisted D2D discovery used herein can be referred to as operator-assisted D2D discovery.

FIG. 1 illustrates wireless devices (e.g., mobile devices 220 and 230) configured to communicate 214 and 212 with a transmission station 210 via the operator network, where the wireless devices are also configured to communicate 222 with each other via the ad-hoc, D2D network. The device discovery process can include a device discovery message transmitted using the operator network, where the device discovery message instructs at least a pair of the wireless devices of the device discovery period allowing the two wireless devices to discover each other and communicate with each other via the ad-hoc, D2D network. The device discovery process assisted by the operator network can improve the speed and power efficiency of the D2D device discovery.

Figure 2:
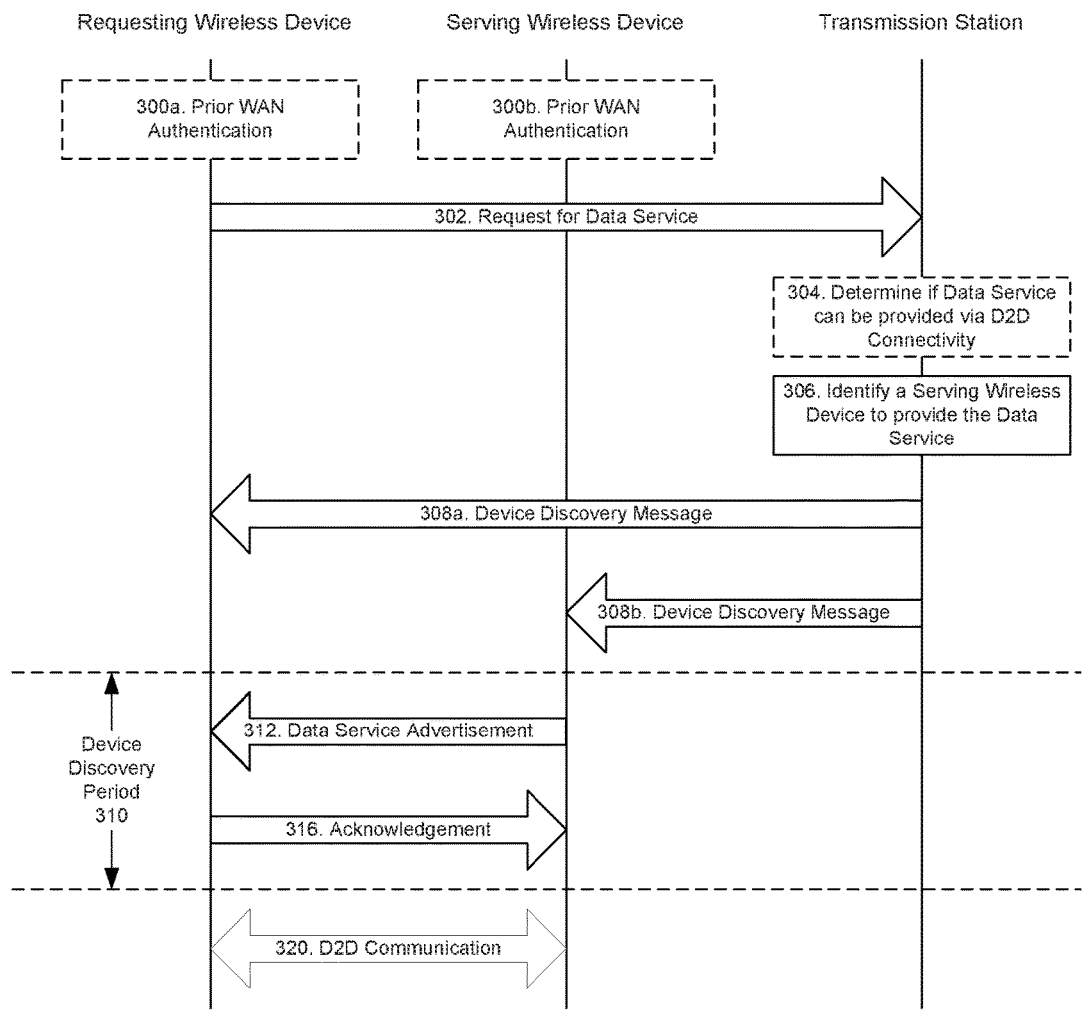
FIG. 2 illustrates an example process for operator-assisted device-to-device discovery using a data service advertisement in accordance with an example.

The following provides additional details of the examples. FIG. 2 illustrates an example process for operator-assisted device-to-device discovery. At least two wireless devices can be in communication with an operator network. A requesting wireless device can be a wireless device (e.g., mobile device) requesting a data service and/or a specific subscriber (or subscribers) at a specified interval of time. The data service as used herein can include data content and/or services. Content can include a multimedia stream, a video stream, an audio stream, a graphics file, an audio file, a text file, an executable file, a multimedia file, or another type of data file. Services can include gaming, social networking, and other interactive services. A serving wireless device can be a wireless device configured to provide data services for the requesting wireless device at the specified interval of time. A wireless device can request a data service during one interval of time (e.g., be the requesting wireless device), and provide the data service at another interval of time (e.g., be the serving wireless device). The requesting wireless device and the serving wireless device can have prior authentication from the operator network 300a-b.

When a user of the requesting wireless device desires data services and/or specific subscribers, the requesting wireless device can send a request for data services and/or the specific subscriber(s) 302 to a serving transmission station. The request for data services can include the request for data services and/or a request for the specific subscriber. A unicast message can be used to send the request for data services. A unicast message is a message sent by one wireless device to one wireless device. The request can include an identification of the data service requested. The request can also include client specific information such as power, loading, location, and other similar information about the requesting wireless device.

Upon receipt of the request for data services, the operator network can determine whether the data service can be provided via D2D connectivity 304 or whether the data service is only available via the transmission station. If the operator network determines that the data service may be delivered via D2D connectivity, the operator network may check several pieces of information. If the operator network has access to a data repository (e.g., a database or a cloud application) of available subscriber services, the operator network may check the data repository to determine whether the requested subscriber(s) or, if specific subscribers were not requested, whether subscribers in the service area have indicated possession of the relevant data service as well as a willingness (e.g., permissions) to share the relevant data with peers (e.g., a requesting wireless device). The operator network may identify one or more potential serving wireless devices (e.g., server device) to provide the data service 306.

If the operator network has access to specific location information of the subscribers in the operator network, a processor in the operator network may check the location of the requesting wireless device against potential serving wireless devices in the service area. The service area may be a cell for a transmission station or node. The service area may include a macro cell associated with a macro evolved Node B (macro-eNB), a cell associated with a low power node (LPN), a micro cell associated with a micro-eNB, a pico cell associated with a pico-eNB, a femto cell associated with a femto-eNB, a home cell associated with a home eNB (HeNB), or a WiFi access point (WAP).

Depending on the information available to the operator network, the operator network may narrow down the pool of potential peers to the subscribers that were requested, have the requested data service, are willing to share the requested data service, and/or are in the vicinity or proximity of the requesting wireless device. If the operator network can narrow the pool of potential peers to a list of potential serving wireless devices, the transmission station can send a multi-cast device discovery message to the potential serving wireless devices. Otherwise, the transmission station can send a broadcast device discovery message 308b to the pool of potential peers in the service area. The multi-cast message and broadcast message can be a message from one wireless device to multiple wireless devices. In another example, the transmission station can send unicast device discovery messages to the potential serving wireless devices. The transmission station can also send the device discovery message 308a to the requesting wireless device. The device discovery message can include a proposed device discovery period 310 for the D2D, ad-hoc network. In another example, the device discovery message can include the data service being requested and/or the location of the requesting wireless device.

Upon receipt of the device discovery message, the potential serving wireless devices may check their current conditions (e.g., power, traffic load, and other conditions) to determine whether the wireless devices can engage in D2D data service sharing. If the device discovery message includes the requested data service, the potential serving wireless devices may also check whether the wireless devices have the requested data service available and permission to share the requested data service.

If location information is included in the device discovery message, the potential serving wireless devices may also check their location to determine if at least one potential serving wireless device is in the vicinity of the requesting wireless device. In an example, a wireless device can have a location mechanism, such as a global positioning system (GPS) receiver, to determine a current location of the wireless device. Other location mechanism can also be used.

If a potential serving wireless device has the requested data service, the wireless device is willing to share the requested data service, and/or the wireless device is in the vicinity or proximity of the requesting wireless device; the potential serving wireless device may broadcast a data service advertisement 312 on a D2D link to the requesting wireless device during the device discovery period 310. During the proposed device discovery period, the requesting wireless device may listen on the D2D link for the data service advertisement from the potential serving wireless device. The advertisement may include information about the data service available from the potential serving wireless device. After successfully receiving the data service advertisement, the requesting wireless device may transmit an acknowledgement 316 on the D2D link indicating the requesting wireless device's willingness to "pair" with the potential serving wireless device. If the data service advertisement and the acknowledgement (ACK) are successfully received, the D2D communication 320 can then be setup between the requesting wireless device and the serving wireless device using the D2D link.

In another embodiment, the transmission station may send a first device discovery message including a first device discovery period to just the requesting wireless device and a potential serving wireless device in a first pair of wireless devices. The transmission station may send a second device discovery message including a second device discovery period to a second requesting wireless device and a second potential serving wireless device in a second pair of wireless devices, where second device discovery period occurs at a different time interval from the first device discovery period, and so forth.

Figure 3:
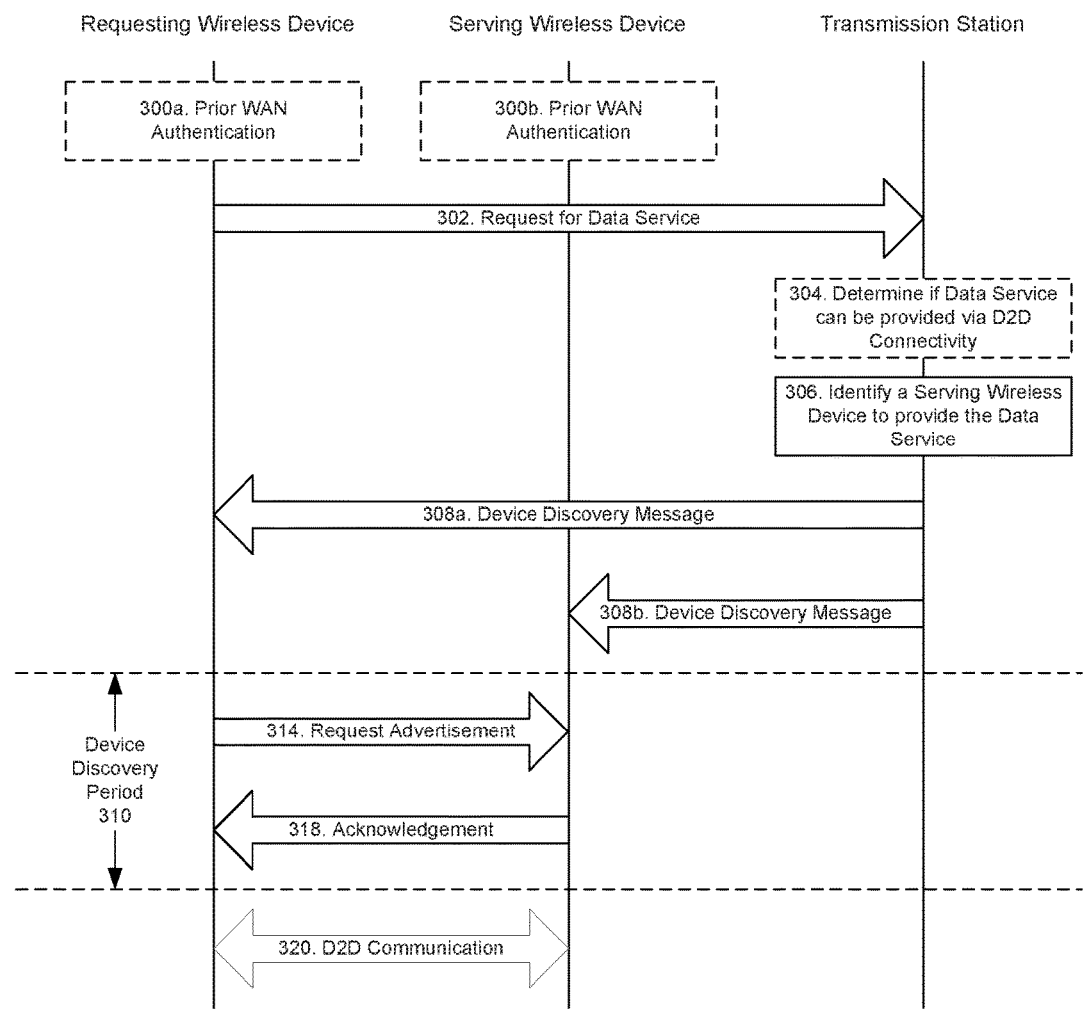
FIG. 3 illustrates an example process for operator-assisted device-to-device discovery using a request for data service in accordance with an example.

FIG. 3 illustrates another example process for operator-assisted device-to-device discovery. The requesting wireless device may broadcast a request advertisement 314 on D2D link to the potential serving wireless devices during the device discovery period 310. During the proposed device discovery period, the potential serving wireless devices in the service area may listen on the D2D link for the request advertisement. After successfully receiving the request advertisement and if the potential serving wireless device has permission and resources (which can include sufficiently good channel quality to the requesting wireless device to support the desired quality of service [QoS]) to provide the requested data service, the potential serving wireless device may transmit an acknowledgement 318 indicating the potential serving wireless device's willingness to "pair" with the requesting wireless device. If the request advertisement and the acknowledgement are successfully received, the D2D communication 320 can then be setup between the requesting wireless device and the serving wireless device using the D2D link.

In another example, the requesting wireless device may broadcast a request advertisement and the potential serving wireless devices in the service area may broadcast data service advertisements during the device discovery period. During the proposed device discovery period, the requesting wireless device may listen for the data service advertisements and the potential serving wireless devices in the service area may listen for the request advertisement. Contention based mechanisms may be used to resolve situations where the data service advertisements are transmitted at a substantially same time as the request advertisement. The wireless devices may transmit acknowledgements indicating a willingness to "pair". If one request advertisement and one acknowledgement are successfully received or one data service advertisement and one acknowledgement are successfully received, the D2D communication can then be setup between the requesting wireless device and the serving wireless device using the D2D link.

The requesting wireless device and the serving wireless device may stop listening or transmitting advertisements after the device discovery period has ended to conserve power. In an example, the device discovery period can be ten milliseconds (i.e., 10 msec) to five seconds (i.e., 5 sec). The device discovery period may be long enough for the serving wireless device to transition from a sleep mode or idle mode to an active or connected mode, so the serving wireless device can receive the request advertisement or transmit the data service advertisement in the discovery period. In another example, the time duration between the transmission of the device discovery message and the start of the device discovery period may be long enough for the serving wireless device to transition from a sleep mode or idle mode to an active or connected mode and still receive the request advertisement or transmit the data service advertisement in the discovery period. In an embodiment, when the requesting wireless device and the serving wireless device successfully pair (e.g., communicate via the D2D link) within the device discovery period, the requesting wireless device or the serving wireless device may send a message to the transmission station indicating the successful pairing. In another embodiment, when the requesting wireless device and the serving wireless device fail to pair (e.g., do not communicate via the D2D link) within the device discovery period, the requesting wireless device or the serving wireless device may send a message to the transmission station indicating a failed D2D connection. The transmission station may send another device discovery message including a later device discovery period to the requesting wireless device and the serving wireless device, which failed to successfully communicate and pair up via the D2D link. In another example, the transmission station may send another device discovery message including a later device discovery period to the requesting wireless device and the potential serving wireless devices in the service area. In another example, the transmission station may send a "no serving wireless device available" message to the requesting wireless device indicating that no potential serving wireless device is available. The "no serving device available" message may occur if no potential serving wireless device is within D2D transmission range, or if no serving wireless device has permission to share the data service with the requesting wireless device. The transmission station may continue to provide the data content or service via the operator network connection when no serving wireless device is available via the D2D link.

FIGS. 2 and 3 illustrate the operator network used to propose a relatively short common device discovery period to speed up the process and improve "peer pairing" success rates. "Over the air signaling" including the transmission and reception of the request for data services and/or subscriber(s) message and the device discovery message may be included in the protocol or standard used by the operator network. In reducing the device discovery to a narrow device discovery period using the operator network connection, instead of listening and/or transmitting in a longer discovery time duration on the D2D, ad-hoc network alone; the power and resources of the wireless devices can be conserved and the bandwidth consumption of the D2D link can be reduced due to fewer transmissions during the device discovery process. Per bit transmitted, the operator network connection can be more efficient than an ad-hoc, D2D connection. For example, in some applications, WiFi can consume 10 to 100 times more power than using a WAN protocol per bit transmitted. So using a WiFi D2D link without assistance from an operator's WAN for device discovery may accelerate the drain of the battery of the wireless device.

Using the device discovery message via the operator network (e.g., operator-assisted D2D discovery) can provide additional benefits over using protocols such as WiFi Direct or Bluetooth. In WiFi Direct or Bluetooth, at least one of the users of the wireless devices owns the D2D connection between the requesting wireless device and the serving wireless device, where security authentication is performed by one of the wireless devices. Establishing security and physically or manually setting up the wireless devices so the devices can find each other can be cumbersome. Security authentication attempts to address the trustworthiness of a user and protect users from each other. In WiFi Direct, the users of the wireless devices may be known to each other and security keys and other identifying information can be exchanged when users are in the vicinity of each other. Setting up a D2D connection using WiFi Direct or Bluetooth can be cumbersome and may use a human being as the authenticator in a manual process.

In operator-assisted D2D discovery, the wireless device may already be authenticated via the operator network connection, so no additional authentication may be needed. In addition, operator-assisted D2D discovery can provide automatic authentication without manual human action.

The operator network can provide the benefits of determining the vicinity or proximity of the requested data services and/or subscriber(s) relative to a requesting wireless device, without using a random search process on the ad-hoc, D2D network to find the requested data services and/or subscriber(s). The operator network can store information in a data repository about the data services available from specific subscribers. The operator network can also store information in a data repository about which subscribers have permission to access specific data services from specific subscribers. The operator network can also store information in a data repository about the location of subscribers. The operator network can use the device discovery message to wake up the serving wireless device from an idle mode. Allowing the serving wireless device to remain idle until the requesting wireless device is ready can reduce the battery drain on the serving wireless device. The operator network can pair the wireless device requesting the data service with the wireless device that can provide the requested data service. The operator network can schedule a common device discovery period for the serving wireless device and the requesting wireless device to communicate on the D2D link. The device discovery message may include an indication of a channel or a sub-channel for device discovery on the D2D link, when multiple channels or sub-channels are used for device discovery. Although, the operator network may not control the serving wireless device and the requesting wireless device, the operator network can propose or suggest a device discovery period for the pair of wireless devices to communicate on the D2D link.

In another example, the device discovery message can provide information about the requested data services and/or subscriber(s) in a reduced message or coded message to reduce the size of the message transmitted. The reduced message or coded message may be mapped to an identifier of the data services and/or subscriber(s) in the transmission station, the requesting wireless device, and/or the serving wireless device. The request for data service and/or subscriber(s) message, the device discovery message, the advertisement, and/or the acknowledgement can include a control message with control signaling. For example, a first time a data service identifier is used the message may include a full identifier. In subsequent messages, a control message (with a reduced size relative to the full identifier) may be used. The operator network may setup rules about the data services and/or locations tracked by the operator network in the data repository (e.g., the database or cloud application). The data services and/or locations may track with the serving wireless device and be updated in the subscriber's home and/or local agent. As a user moves, the data service provided by and/or location of the serving wireless device may be updated by home and/or local agents at a different transmission station. The data service may be available to other subscribers (e.g., the requesting wireless device) in the vicinity without the different base station querying the serving wireless device when the serving wireless device moves within the different base station's transmission range.

Figure 4:
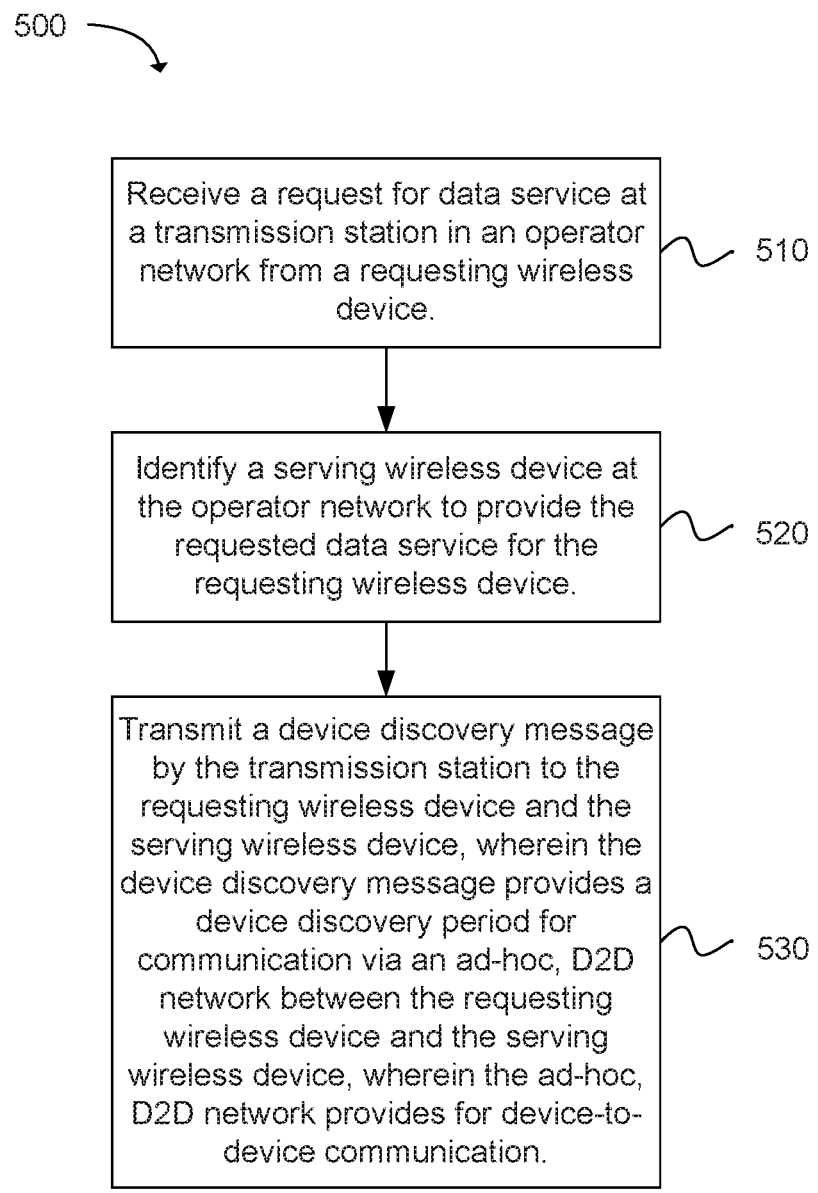
FIG. 4 depicts a flow chart for operator-assisted device-to-device discovery at a transmission station in accordance with an example.

Another example provides a method 500 for operator-assisted device-to-device discovery, as shown in the flow chart in FIG. 4. The method may be executed as instructions on a machine, where the instructions are included on at least one computer readable medium. The method includes the operation of receiving a request for data service at a transmission station in an operator network from a requesting wireless device, as in block 510. The operation of identifying a serving wireless device at the operator network to provide the requested data service for the requesting wireless device follows, as in block 520. The next operation of the method can be transmitting a device discovery message by the transmission station to the requesting wireless device and the serving wireless device, wherein the device discovery message provides a device discovery period for communication via an ad-hoc, D2D network between the requesting wireless device and the serving wireless device, wherein the ad-hoc, D2D network provides for device-to-device communication, as in block 530.

In an example, the ad-hoc, D2D network provides for non-authenticated user communication unless authentication is manually entered by users. The request for data service can further include an identification of the data service or data content requested, a subscriber requested, desired quality of service (QoS) of the data service, a location of the requesting wireless device, a transmission power level of the requesting wireless device, a traffic loading of the requesting wireless device, an allowable transmission rate of the requesting wireless device, and combinations of this requested information. In an example, the device discovery period can be less than five seconds. The ad-hoc, D2D network can include a licensed band network, a unlicensed band network, a wireless wide area network (WWAN), a wireless local area network (WLAN), a wireless personal area network (WPAN), and combinations of these networks. The request for data service can be configured to be received via a unicast message, and the device discovery message can be configured to be transmitted via a broadcast, multicast, or unicast message. The device discovery message can recommend the serving wireless device to advertise during the device discovery period, and the device discovery message can recommend the requesting wireless device to listen for an advertisement during the device discovery period. In another example, the device discovery message can recommend the requesting wireless device to request the data service during the device discovery period, and the device discovery message can recommend the serving wireless device to listen for the request during the device discovery period. In another example, the device discovery message can recommend the requesting wireless device to request the data service during the device discovery period and to listen when requesting wireless device is not transmitting, and the device discovery message can recommend the serving wireless device to advertise during the device discovery period and to listen when the serving wireless device is not transmitting.

The method can further include the transmission station authenticating the requesting wireless device and the serving wireless device via the operator network's authentication protocol before transmitting the device discovery message. The operation of identifying potential serving wireless devices can further include searching a data repository to determine if the requested subscriber, or if none were requested, any subscribers have the data service requested by the requesting wireless device. If the data repository contains data service access permissions, the operation of identifying potential serving wireless devices can further include checking that the requested subscriber with the data service has permission to provide the data service to the requesting wireless device. If the data repository contains subscriber location information, the operation of identifying potential serving wireless devices can further include checking that the location of the requested subscriber with the requested data service and, if the location of the requested subscriber exists, permission to share the data service with the requesting wireless device) are in proximity of the requesting wireless device. If location information does not exist in the data repository, the operator network may check the real-time locations of the (requested) subscribers with the requested data service (and sharing permission) to determine whether they are in proximity of the requesting wireless device. The operation of identifying potential serving wireless devices can further include selecting at least one potential serving wireless device from the list of subscribers in proximity of the requesting wireless device that have the requested data service and permission to provide the data service to the requesting wireless device. If no subscribers which have the requested data service (or permission to share the requested data service with the requesting wireless device) are in proximity of the requesting wireless device, the operator network may inform the requesting wireless device that no potential serving wireless devices exist. The operation of transmitting the device discovery message can further include transmitting the device discovery message via a multicast message or unicast message to the requesting wireless device and at least one potential serving wireless device. The requesting wireless device and serving wireless device can include a user equipment (UE) or a mobile station (MS). The requesting wireless device and serving wireless device can be configured to connect to any combination of a wireless local area network (WLAN), a wireless personal area network (WPAN), and a wireless wide area network (WWAN). The first wireless device can include an antenna, a touch sensitive display screen, a speaker, a microphone, a graphics processor, an application processor, internal memory, a non-volatile memory port, or combinations these components. The transmission station can include an evolved Node B (eNodeB), a base station (BS), a macro evolved Node B (macro-eNB), a low power node (LPN), a micro-eNB, a pico-eNB, a femto-eNB, a home eNB (HeNB), a base band unit (BBU), a remote radio head (RRH), a remote radio equipment (RRE), a remote radio unit (RRU), or a wireless access point (WAP).

Figure 5:
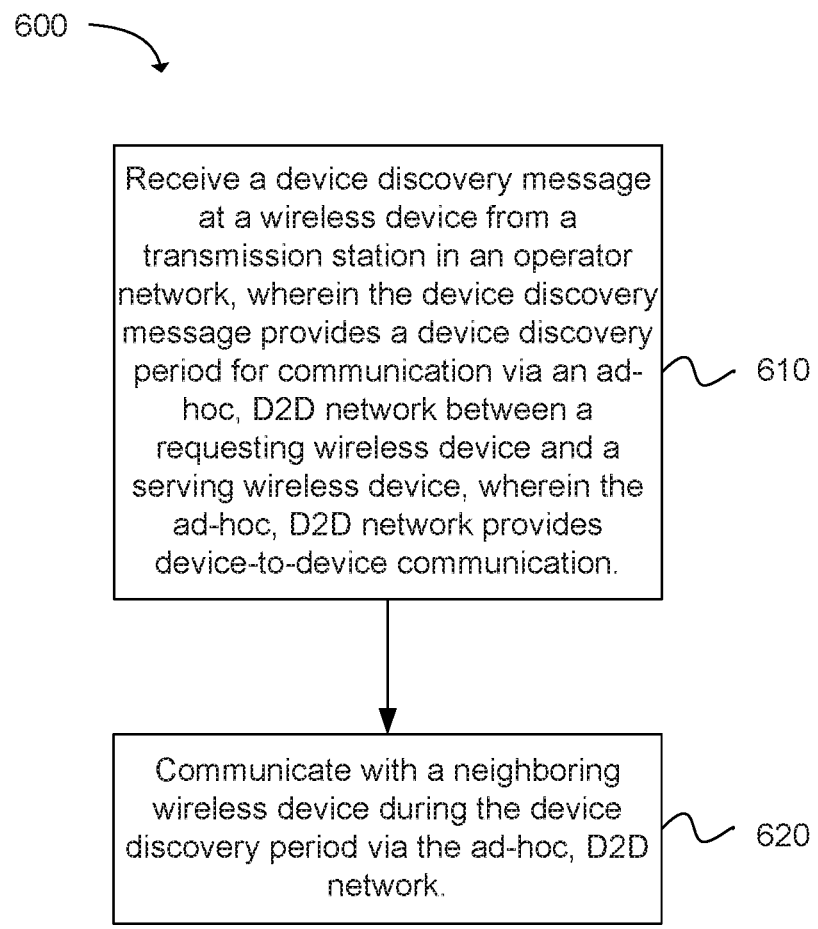
FIG. 5 depicts a flow chart for operator-assisted device-to-device discovery at a wireless device in accordance with an example.

Another example provides a method 600 for operator-assisted device-to-device discovery, as shown in the flow chart in FIG. 5. The method may be executed as instructions on a machine, where the instructions are included on at least one computer readable medium. The method includes the operation of receiving a device discovery message at a wireless device from a transmission station in an operator network, wherein the device discovery message provides a device discovery period for communication via an ad-hoc, D2D network between a requesting wireless device and a serving wireless device, wherein the ad-hoc, D2D network provides device-to-device communication, as in block 610. The operation of communicating with a neighboring wireless device during the device discovery period via the ad-hoc, D2D network follows, as in block 620.

In an example, the ad-hoc, D2D network does not provide user authentication for the communication. The wireless device can be configured as the requesting wireless device and the neighboring wireless device can be configured the serving wireless device. The method can further include the requesting wireless device sending a request for data service to the transmission station. The operation of communicating with the neighboring wireless device can further include requesting the data service from the serving wireless device via the ad-hoc, D2D network during the device discovery period.

In another example, the wireless device can be configured as the serving wireless device and the neighboring wireless device can be configured as the requesting wireless device. The method can further include the serving wireless device waking up from an idle state or a sleep state to an active state when the device discovery message is received. The operation of communicating with the neighboring wireless device can further include advertising the data service to the requesting wireless device via the ad-hoc, D2D network during the device discovery period.

The request for data service can further include an identification of the data service and/or subscriber(s) requested, desired quality of service (QoS) of the data service, a location of the requesting wireless device, a transmission power level of the requesting wireless device, a traffic loading of the requesting wireless device, an allowable transmission rate of the requesting wireless device, and combinations of this requested information. In an example, the device discovery period can be less than five seconds. The ad-hoc, D2D network can include a licensed band network, a unlicensed band network, a wireless wide area network (WWAN), a wireless local area network (WLAN), a wireless personal area network (WPAN), and combinations of these networks. The request for data service can be configured to be transmitted via a unicast message, and the device discovery message can be configured to be received via broadcast, multicast, or unicast messages.

The requesting wireless device can be configured to send the request for data service to the transmission station and the serving wireless device can be configured to receive the device discovery message from the transmission station via a wide area network (WAN) authentication protocol. The requesting wireless device and serving wireless device can include a user equipment (UE) or a mobile station (MS). The requesting wireless device and serving wireless device can be configured to connect to any combination of a wireless local area network (WLAN), a wireless personal area network (WPAN), and a wireless wide area network (WWAN). The first wireless device can include an antenna, a touch sensitive display screen, a speaker, a microphone, a graphics processor, an application processor, internal memory, a non-volatile memory port, or combinations these components. The transmission station can include an evolved Node B (eNodeB), a base station (BS), a macro evolved Node B (macro-eNB), a low power node (LPN), a micro-eNB, a pico-eNB, a femto-eNB, a home eNB (HeNB), a base band unit (BBU), a remote radio head (RRH), a remote radio equipment (RRE), a remote radio unit (RRU), or a wireless access point (WAP).

In another example, a transmission station can be in wireless communication with the wireless device (e.g., the requesting wireless device and/or the serving wireless device). The transmission station can be included within a centralized, cooperative, or cloud radio access network (C-RAN). In the C-RAN, the transmission station (or eNodeB) functionality can be subdivided between a base band unit (BBU) processing pool and a remote radio unit (RRU) or a remote radio head (RRH) with optical fiber connecting the BBU to the RRU.

Figure 6:
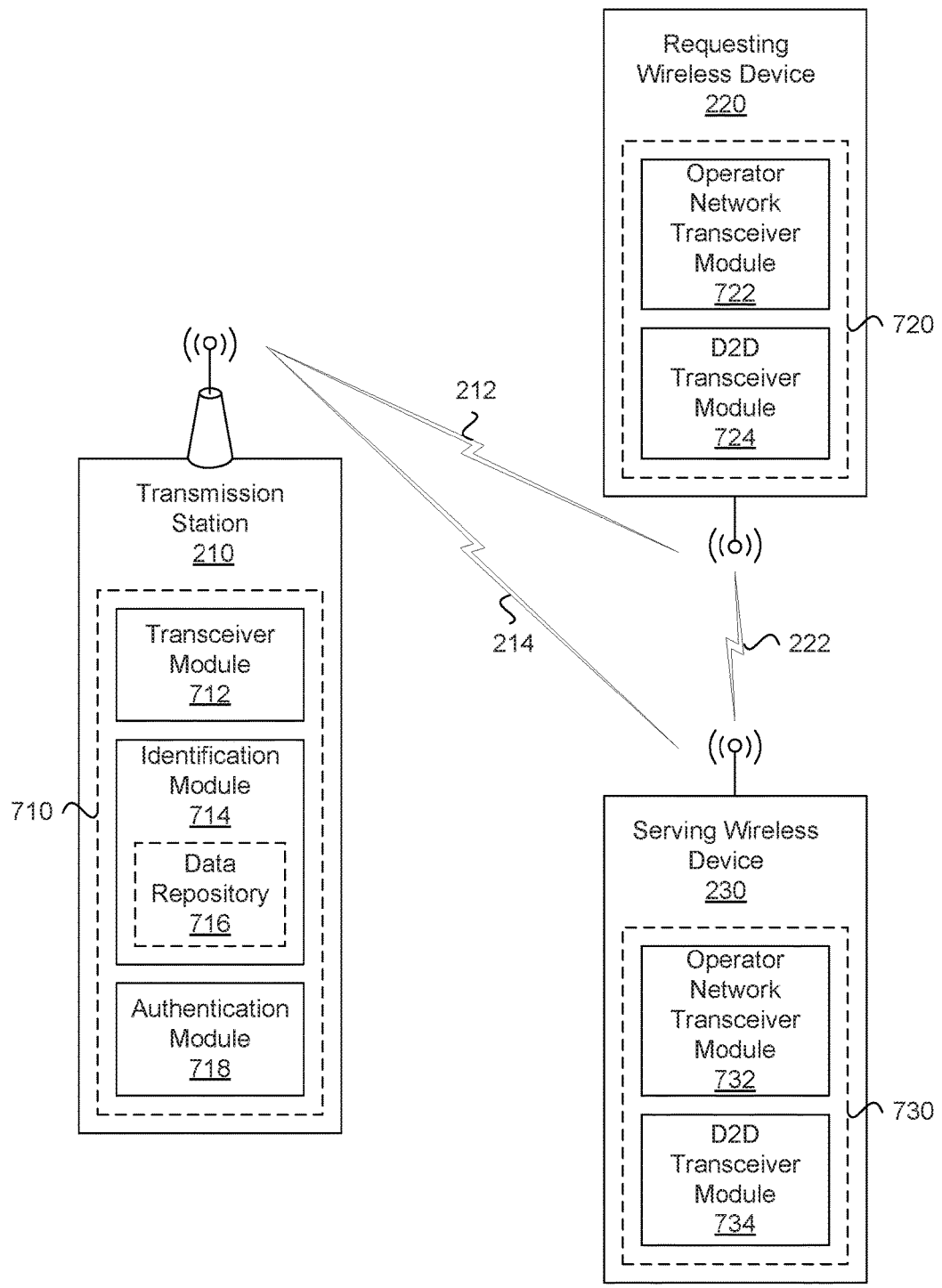
FIG. 6 illustrates a diagram of a transmission station, a requesting wireless device, a serving wireless device in accordance with an example.

FIG. 6 illustrates an example transmission station 210, requesting wireless device 220, and serving wireless device 230. The transmission station can include an operator-assisted device-to-device (D2D) discovery device 710, and each wireless device can include an operator-assisted D2D discovery device 720 and 730. The operator-assisted D2D discovery device configured for the transmission station can include a transceiver module 712 and an identification module 714. The transceiver module can be configured to receive a request for data service and/or subscriber(s) in an operator network from the requesting wireless device. The identification module can be configured to identify a serving wireless device to provide the data service for the requesting wireless device. The transceiver module can be further configured to transmit a device discovery message to the requesting wireless device and the serving wireless device. The device discovery message can provide a device discovery period for communication via an ad-hoc, D2D network between the requesting wireless device and the serving wireless device. The ad-hoc, D2D network provides for device-to-device communication.

In an example, the identification module 714 includes a data repository 716 configured to store the data services available for sharing, the sharing permissions, and/or the locations of subscribers of the operator network. The identification module can be configured to select at least one serving wireless device 230 from the listed subscribers. The identification module can be configured to return a "no potential serving wireless device available" message when no subscribers in proximity of the requesting wireless device has the requested data service and/or permission to share the data service with the requesting wireless device. In another example, the identification module can be coupled to the data repository. The data repository can include a database, a cloud application, or combination of the database and cloud application. In an example, the ad-hoc, D2D network can provide for non-authenticated user communication.

In another example, the operator-assisted D2D discovery device 710 configured for the transmission station 210 can further include an authentication module 718. The authentication module can be configured to authenticate the requesting wireless device 220 and the serving wireless device 230 via an operator network authentication protocol.

The operator-assisted D2D discovery device 720 and 730 configured for the wireless devices 720 and 730 can include an operator network transceiver module 722 and 732 and a D2D transceiver module 724 and 734. The operator network transceiver module can be configured to receive a device discovery message from a transmission station in an operator network. The device discovery message can provide a device discovery period for communication via an ad-hoc, D2D network between a requesting wireless device and a serving wireless device. The ad-hoc, D2D network can provide device-to-device communication. The D2D transceiver module can be configured to communicate with a neighboring wireless device during the device discovery period via the ad-hoc, D2D network.

In an example, the ad-hoc, D2D network does not provide user authentication for the communication. The operator network transceiver module 722 and 732 can be further configured to send a request for data services and/or subscribers to a transmission station 210. The D2D transceiver module 724 and 734 can be further configured to request the data service from a neighboring wireless device via the ad-hoc, D2D network. The D2D transceiver module can be further configured to advertise the data service to a neighboring wireless device via the ad-hoc, D2D network. The wireless device 220 and 230 can further include a wake up module (not shown) configured to wake up a wireless device from an idle state or a sleep state to an active state when the device discovery message is received. The data service can be configured to transfer data content including a multimedia stream, a video stream, an audio stream, a graphics file, an audio file, a text file, an executable file, a multimedia file, and combinations of this data content. The data service can be configured to transfer instructions and/or information for services, such as gaming or social networking. The operator network transceiver module can use a wireless WAN (WWAN) protocol 212 and 214 selected from the group consisting of a third generation partnership project (3GPP) long term evolution (LTE) standard and an Institute of Electrical and Electronics Engineers (IEEE) 802.16 standard. In another example, the operator network transceiver module can use a wireless LAN (WLAN) protocol 212 and 214 selected from the Institute of Electrical and Electronics Engineers (IEEE) 802.11 standard. The D2D transceiver module can use a D2D protocol 222 including a 3GPP LTE standard, an IEEE 802.16 standard, an IEEE 802.11 standard, an IEEE 802.15 standard, a Bluetooth standard, a Wireless Display Port standard, a WiGig standard, an Ultra-WideBand (UWB) standard, a Wireless HD standard, a Wireless Home Digital Interface (WHDI) standard, a ZigBee standard, a proprietary unlicensed standard, a proprietary licensed standard, or combinations of these protocols.

Figure 7:
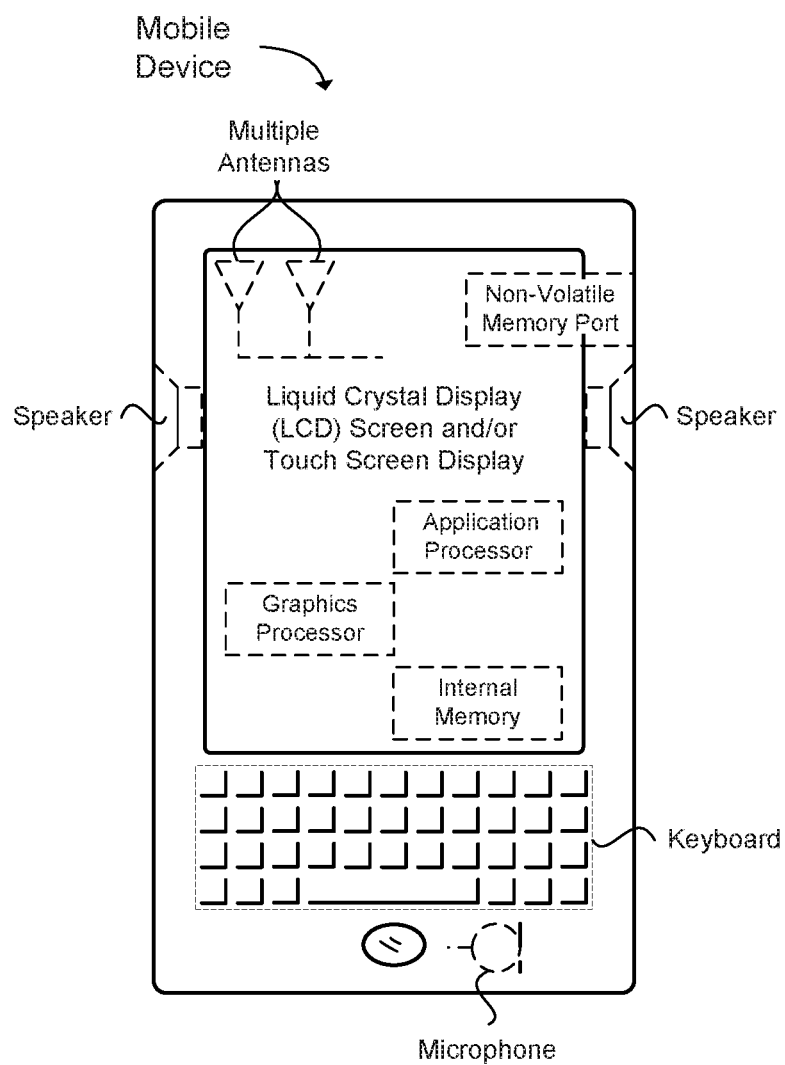
FIG. 7 illustrates a diagram of a mobile device in accordance with an example.

FIG. 7 provides an example illustration of the wireless device, such as a user equipment (UE), a mobile station (MS), a mobile wireless device, a mobile communication device, a tablet, a handset, or other type of mobile wireless device. The mobile device can include one or more antennas configured to communicate with the transmission station, such as a base station (BS), an evolved Node B (eNB), a base band unit (BBU), a remote radio head (RRH), a remote radio equipment (RRE), a relay station (RS), a radio equipment (RE), other types of wireless wide area network (WWAN) access points, or a wireless local area network (WLAN) access point (WAP). The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 7 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a first user equipment (UE) operable to perform wireless wide area network (WWAN) operator-assisted device-to-device (D2D) communications with a second UE, the apparatus comprising:
one or more processors configured to:
process, at the first UE, D2D discovery and wireless local area network (WLAN) configuration information received from a WWAN when the first UE and the second UE are within a WLAN direct communications range; and
initiate, at the first UE, operator-assisted WLAN direct communications with the second UE within the WLAN direct communications range using the D2D discovery and WLAN configuration information received from the WWAN,
wherein the D2D discovery and WLAN configuration information enables security on a D2D-assisted WLAN direct communications link between the first UE and the second UE; and
memory configured to store the D2D discovery and WLAN configuration information.

2. The apparatus of claim 1, further comprising a transceiver configured to receive the D2D discovery and WLAN configuration information from the WWAN.

3. The apparatus of claim 1, wherein a D2D-assisted WLAN direct communications link between the first UE and the second UE provides a desired quality of service (QoS) to support an end user application.

4. The apparatus of claim 1, wherein the first UE includes an antenna, a touch sensitive display screen, a speaker, a microphone, a graphics processor, an application processor, an internal memory, a non-volatile memory port, or combinations thereof.

5. An apparatus of an evolved universal terrestrial radio access network (E-UTRAN) operable to assist a first user equipment (UE) and a second UE in operator-assisted device-to-device (D2D) communications, the apparatus comprising:
one or more processors configured to:
determine, at the E-UTRAN, when the first UE and the second UE are within a wireless local area network (WLAN) direct communications range;
identify, at the E-UTRAN, D2D discovery and WLAN configuration information; and
process, at the E-UTRAN, the D2D discovery and WLAN configuration information for transmission to the first UE to enable the first UE to perform operator-assisted D2D communications with the second UE when the first UE and the second UE are within the WLAN direct communications range; and
memory configured to store the discovery and WLAN configuration information.

6. The apparatus of claim 5, further comprising a transceiver configured to transmit the D2D discovery and WLAN configuration information to the first UE.

7. The apparatus of claim 5, wherein the D2D discovery and WLAN configuration information enables security on a D2D-assisted WLAN direct communications link between the first UE and the second UE.

8. The apparatus of claim 5, wherein the one or more processors are further configured to determine whether a D2D-assisted WLAN direct communications link between the first UE and the second UE provides a desired quality of service (QoS) to support an end user application.

9. At least one non-transitory machine readable storage medium having instructions embodied thereon for performing operator-assisted device-to-device (D2D) communications between a first user equipment (UE) and a second UE, the instructions when executed by one or more processors cause the first UE to perform the following:
processing, at the first UE, D2D discovery and wireless local area network (WLAN) configuration information received from an evolved universal terrestrial radio access network (E-UTRAN); and
initiating, at the first UE, operator-assisted WLAN direct communications with the second UE using the D2D discovery and WLAN configuration information received from the E-UTRAN, and when the first UE and the second UE are within a WLAN direct communications range,
wherein the D2D discovery and WLAN configuration information enables security on a D2D-assisted WLAN direct communications link between the first UE and the second UE.

10. The at least one non-transitory machine readable storage medium of claim 9, further comprising instructions which when executed by the one or more processors cause the first UE to perform the following: storing the D2D discovery and WLAN configuration information in a memory of the first UE.

11. The at least one non-transitory machine readable storage medium of claim 9, wherein a D2D-assisted WLAN direct communications link between the first UE and the second UE provides a desired quality of service (QoS) to support an end user application.

12. The at least one non-transitory machine readable storage medium of claim 9, wherein the operator-assisted WLAN direct communications include a device discovery message.

13. The at least one non-transitory machine readable storage medium of claim 9, wherein the operator-assisted WLAN direct communications occurs on an unlicensed band.

14. At least one non-transitory machine readable storage medium having instructions embodied thereon for assisting a first user equipment (UE) and a second UE in operator-assisted device-to-device (D2D) communications, the instructions when executed by one or more processors cause an evolved universal terrestrial radio access network (E-UTRAN) to perform the following:
determining, at the E-UTRAN, when the first UE and the second UE are within a wireless local area network (WLAN) direct communications range;
generating, at the E-UTRAN, D2D discovery and WLAN configuration information; and
processing, at the E-UTRAN, the D2D discovery and WLAN configuration information for transmission from the E-UTRAN to the first UE to enable the first UE to perform operator-assisted D2D communications with the second UE when the first UE and the second UE are within the WLAN direct communications range.

15. The at least one non-transitory machine readable storage medium of claim 14, further comprising instructions which when executed by the one or more processors cause the E-UTRAN to perform the following: storing the D2D discovery and WLAN configuration information in a memory at the E-UTRAN.

16. The at least one non-transitory machine readable storage medium of claim 14, further comprising instructions which when executed by the one or more processors cause the E-UTRAN to perform the following: determining when the first UE and the second UE are within a WLAN direct communications range in response to receiving a request from an application executing on the first UE.

17. The at least one non-transitory machine readable storage medium of claim 14, wherein the D2D discovery and WLAN configuration information enables security on a D2D-assisted WLAN direct communications link between the first UE and the second UE.

18. The at least one non-transitory machine readable storage medium of claim 14, further comprising instructions which when executed by the one or more processors cause the E-UTRAN to perform the following: determining whether a D2D-assisted WLAN direct communications link between the first UE and the second UE provides a desired quality of service (QoS) to support an end user application.

19. The at least one non-transitory machine readable storage medium of claim 14, wherein the operator-assisted WLAN direct communications include a device discovery message.

20. The at least one non-transitory machine readable storage medium of claim 14, wherein the operator-assisted WLAN direct communications occurs on an unlicensed band.

* * * * *